USOO7036263B2

(12) United States Patent
Yang et al.

(10) Patent No.: US 7,036,263 B2
(45) Date of Patent: May 2, 2006

(54) SNAG-FREE AND STRESS-FREE FISH CATCHER

(76) Inventors: David Yang, 828 King St., San Gabriel, CA (US) 91776; Wayne Yang, 828 King St., San Gabriel, CA (US) 91776

( * ) Notice: Subject to any disclaimer, the term of this patent is extended or adjusted under 35 U.S.C. 154(b) by 0 days.

(21) Appl. No.: 10/704,309

(22) Filed: Nov. 10, 2003

(65) Prior Publication Data
US 2005/0097803 A1  May 12, 2005

(51) Int. Cl.
*A01K 77/00* (2006.01)
(52) U.S. Cl. .................................... 43/11; 43/7
(58) Field of Classification Search .............. 43/7, 43/11, 4, 12; 210/169, 471
See application file for complete search history.

(56) References Cited

U.S. PATENT DOCUMENTS

| 483,079 | A | * | 9/1892 | McAdams ..................... 43/11 |
| 589,047 | A | * | 8/1897 | Thomas ....................... 43/9.2 |
| 866,087 | A | * | 9/1907 | Temper ....................... 220/495 |
| 1,291,429 | A | * | 1/1919 | Daniels ....................... 210/467 |
| 1,307,569 | A | * | 6/1919 | Willis ......................... 210/485 |
| 1,310,553 | A | * | 7/1919 | Arnold ......................... 43/12 |
| 1,986,780 | A | * | 1/1935 | Loring .......................... 43/11 |
| 2,006,566 | A | * | 7/1935 | Zimmer ....................... 210/495 |
| 2,057,055 | A | * | 10/1936 | Pratt, Sr. ........................ 43/12 |
| 2,127,332 | A | * | 8/1938 | Haggstrom ...................... 43/12 |
| 2,187,460 | A | * | 1/1940 | McIntire .......................... 43/7 |
| 2,275,268 | A | * | 3/1942 | Prinzler ....................... 210/471 |
| 2,283,488 | A | * | 5/1942 | Cox ............................ 220/491 |
| 2,531,551 | A | * | 11/1950 | Brecht et al. ..................... 43/4 |
| 2,549,475 | A | * | 4/1951 | Jardim ........................... 43/11 |
| 2,587,770 | A | * | 3/1952 | Schatz ........................... 43/12 |
| 2,652,656 | A | * | 9/1953 | Glasser .......................... 43/12 |
| 2,670,557 | A | * | 3/1954 | Pachner ........................... 43/4 |
| 2,883,783 | A | * | 4/1959 | Del Matter ....................... 43/4 |
| 2,971,284 | A | * | 2/1961 | Opel ............................. 43/11 |
| 3,023,530 | A | * | 3/1962 | Jacob ............................ 43/12 |
| 3,032,908 | A | * | 5/1962 | Cohen et al. ..................... 43/12 |
| 3,354,575 | A | * | 11/1967 | Darrow ........................... 43/4 |
| 3,484,981 | A | * | 12/1969 | Gilmer .......................... 43/12 |
| 3,530,610 | A | * | 9/1970 | Bremer .......................... 43/11 |
| 3,747,250 | A | * | 7/1973 | Willinger ....................... 43/11 |
| 3,846,320 | A | * | 11/1974 | Edwards ....................... 210/471 |
| 3,879,879 | A | * | 4/1975 | Bobo ............................. 43/4 |
| 3,949,510 | A | * | 4/1976 | Johnson .......................... 43/4 |
| 3,958,356 | A | * | 5/1976 | Clingan .......................... 43/4 |
| 4,034,710 | A | * | 7/1977 | Carter ........................... 43/11 |
| 4,048,742 | A | * | 9/1977 | Clingan .......................... 43/4 |
| 4,060,923 | A | * | 12/1977 | Schmitz .......................... 43/4 |
| 4,063,380 | A | * | 12/1977 | Grim ............................ 43/11 |
| 4,125,956 | A | * | 11/1978 | Killian .......................... 43/11 |

(Continued)

FOREIGN PATENT DOCUMENTS

DE        2362460  A1 *  6/1975

(Continued)

*Primary Examiner*—Darren W. Ark
(74) *Attorney, Agent, or Firm*—Raymond Y. Chan; David & Raymond

(57) ABSTRACT

A snag-free and stress-free fish catcher includes a supporting frame, a fish pocket, having a fish cavity, supported by the supporting frame, and a tension resting bed, having a tension surface, supported within the fish cavity, wherein the tension surface of the tension resting bed has a predetermined tension larger than a weight of the fish. Therefore, when the fish is captured within the fish cavity of the fish pocket, the fish lies on the tension surface of the tension resting bed in a flatten manner.

1 Claim, 3 Drawing Sheets

U.S. PATENT DOCUMENTS

| | | | | |
|---|---|---|---|---|
| 4,176,419 | A | * | 12/1979 | MacDonald ................. 15/1.7 |
| 4,212,740 | A | * | 7/1980 | Greene ..................... 210/169 |
| 4,251,938 | A | * | 2/1981 | Goldman et al. ............. 43/11 |
| 4,272,906 | A | * | 6/1981 | Liebling ..................... 43/11 |
| 4,290,221 | A | * | 9/1981 | Dotson, Sr. .................. 43/4 |
| 4,477,993 | A | * | 10/1984 | Woermbke ................... 43/11 |
| 4,932,150 | A | * | 6/1990 | Sher ........................... 43/7 |
| 5,054,226 | A | * | 10/1991 | Hart ............................ 43/4 |
| 5,137,623 | A | * | 8/1992 | Wall et al. ................. 210/169 |
| 5,276,989 | A | * | 1/1994 | Lumb et al. .................. 43/11 |
| 5,276,995 | A | * | 1/1994 | Johnson ..................... 43/133 |
| 5,333,633 | A | * | 8/1994 | Laube ....................... 134/182 |
| 5,342,513 | A | * | 8/1994 | Wall et al. ................. 210/169 |
| 5,417,005 | A | * | 5/1995 | Hale ............................ 43/4 |
| 5,422,001 | A | * | 6/1995 | Yagoda et al. ............. 210/169 |
| 5,605,003 | A | * | 2/1997 | Krc et al. ..................... 43/12 |
| 5,822,908 | A | * | 10/1998 | Blanchard ..................... 43/11 |
| 5,902,481 | A | * | 5/1999 | Schwietert ................. 210/464 |
| 5,996,267 | A | * | 12/1999 | Breckenridge ................. 43/12 |
| 6,053,351 | A | * | 4/2000 | Dunton et al. .............. 220/636 |
| 6,270,683 | B1 | * | 8/2001 | Turner ....................... 210/776 |
| 6,615,532 | B1 | * | 9/2003 | Abel ............................ 43/7 |
| 6,694,662 | B1 | * | 2/2004 | McClure ........................ 43/4 |
| 2004/0216354 | A1 | * | 11/2004 | Soest ............................ 43/7 |

FOREIGN PATENT DOCUMENTS

| | | | |
|---|---|---|---|
| DE | 10125755 A1 | * | 12/2002 |
| EP | 522802 A1 | * | 1/1993 |
| GB | 2343097 A | * | 5/2000 |
| JP | 8-131023 A | * | 5/1996 |
| JP | 8-317748 A | * | 12/1996 |
| JP | 2001-204299 A | * | 7/2001 |
| JP | 2003-79272 A | * | 3/2003 |
| JP | 2004-222664 A | * | 8/2004 |
| JP | 2004-229551 A | * | 8/2004 |

* cited by examiner

SNAG-FREE AND STRESS-FREE FISH CATCHER

BACKGROUND OF THE PRESENT INVENTION

1. Field of Invention

The present invention relates to a fish net, and more particularly to a snag-free and stress-free fish catcher, which provides a tension resting bed for the fish lying thereon in a tension manner so as to prevent the fish from being stretched and the scale being damaged. Furthermore, this resting bed will provide a stress-free catch. This stress free attribute is a key element in keeping the fish healthy.

2. Description of Related Arts

A conventional fish net comprises a bounding frame and a net body supported by the bounding frame defining a fishing catching cavity and an opening within the boundary frame to communicate with the fish catching cavity, such that the fish is adapted to be captured in the fish catching cavity. However, the conventional fish net has several drawbacks.

Due to the flexibility of the net body, the fish is stretched to bend within the fish catching cavity by its own weight when the fish is captured in the fish net. It is worth to mention that the fish will struggle in the net body to escape therein and the more the fish struggles the more it becomes entangled. Therefore, the stretch of the fish may hurt its own body or even kill itself. However, the main purpose of the fish net, especially the aquarium fish net is to capture the fish to keep it alive and not to kill the fish. In other words, in order to keep the fish alive during capturing, the net body should provide a flat supporting surface to prevent the fish from being stretched or entangled.

In addition, in order to ensure the maneuverability of the fish net, the net body has a plurality of pores for water permeation. However, fish scales, fish fins, or other fish appendages may be ensnared or entangled in the pores of the net body. When the fish is released from the fish net, the fish scales, fish fins, or other fish appendages ensnared or entangled in the pores will accidentally scrape off from the fish body. One of the solutions for preventing the snagging of the fish appendage is to reduce the size of the pore so as to minimize the chance of the fish appendage scraped off from the fish body. However, the smaller pore will prohibit the flow of water though the net body and reduce the maneuverability of the fish net when submerged in the water. Therefore, the conventional fish net is impractical for capturing the fish in a live and healthy condition.

SUMMARY OF THE PRESENT INVENTION

A main object of the present invention is to provide a snag-free and stress-free fish catcher, which provides a tension resting bed for the fish lying thereon in a tension manner, thereby preventing the snagging of the fish appendage in the fish catcher.

Another object of the present invention is to provide a snag-free and stress-free fish catcher, wherein the tension resting bed provides a tension surface having a predetermined tension larger than a weight of the fish such that the fish is flatted to lie on the tension resting bed to prevent the fish from being stretched or bent within the fish catcher.

Another object of the present invention is to provide a snag-free and stress-free fish catcher, which has a rigid, simple, and strong structure to evenly distribute and support a downward force of the weight of the fish on the tension resting bed.

Another object of the present invention is to provide a snag-free and stress-free fish catcher, wherein the tension resting bed has a plurality of pores formed thereon for water permeation to enhance the maneuverability of the fish catcher without snagging of the fish appendage in the fish catcher.

Another object of the present invention is to provide a snag-free and stress-free fish catcher, wherein no expensive or complicated structure is required to employ in the present invention in order to achieve the above mentioned objects. Therefore, the present invention successfully provides an economic and efficient solution not only for providing the tension resting bed for the fish to lie thereon in a flatted manner so as to prevent the snagging of the fish appendage but also for facilitating the practical use of the fish catcher.

Accordingly, in order to accomplish the above objects, the present invention provides a snag-free and stress-free fish catcher for capturing a fish, comprising:

a supporting frame comprising a boundary rim;

a fish pocket, which is affixed to the boundary rim, having an opening defined within the boundary rim and a fish cavity communicating with the opening; and a tension resting bed, having a tension surface, supported within the fish cavity, wherein the tension surface of the tension resting bed has a predetermined tension larger than a weight of the fish, thereby, when the fish is captured within the fish cavity of the fish pocket, the fish lies on the tension surface of the tension resting bed in a flatten manner.

These and other objectives, features, and advantages of the present invention will become apparent from the following detailed description, the accompanying drawings, and the appended claims.

DETAILED DESCRIPTION OF THE PREFERRED EMBODIMENT

Figure 1:
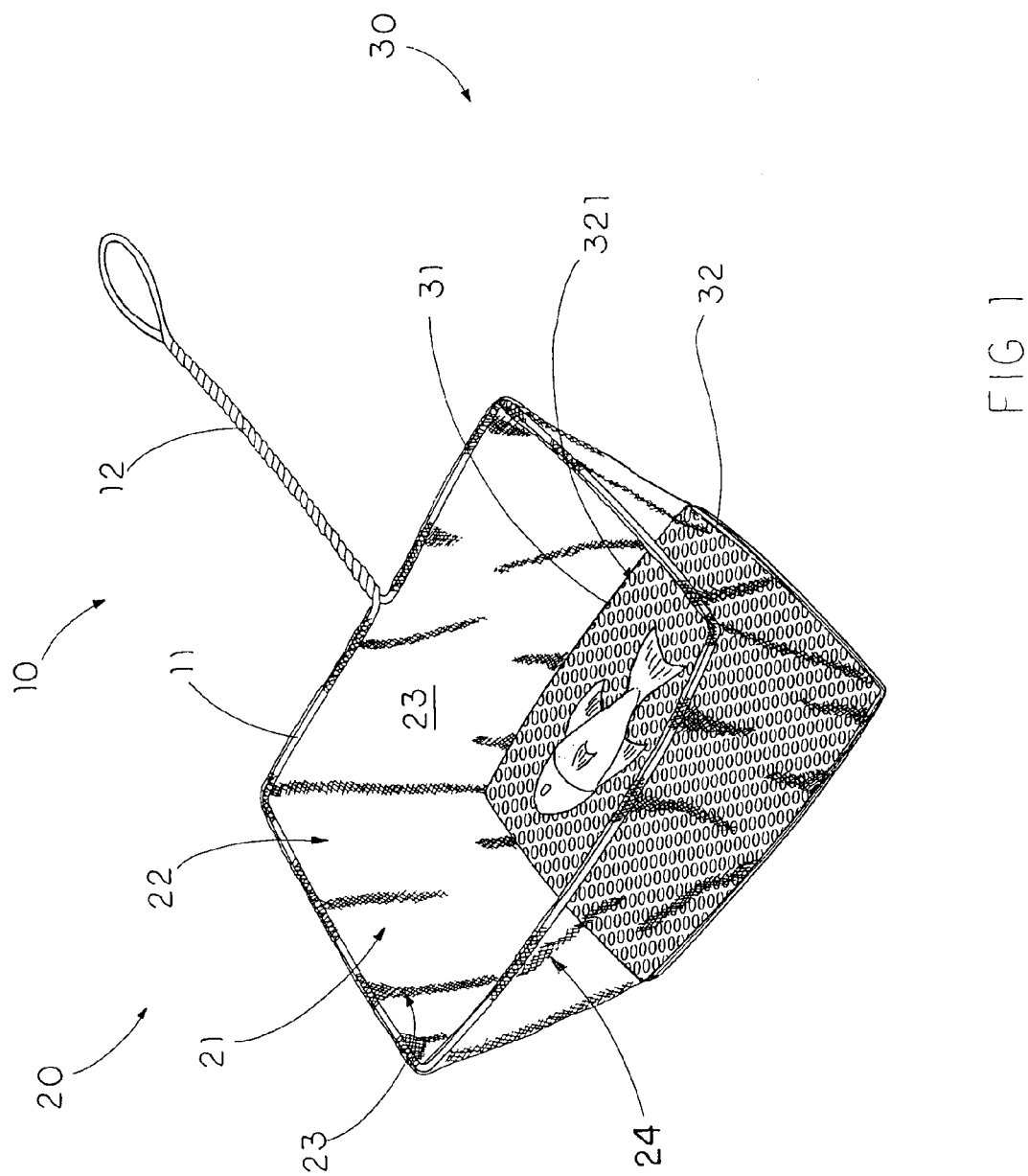
FIG. 1 is a perspective view of a snag-free and stress-free fish catcher according to a first preferred embodiment of the present invention.

Referring to FIG. 1 of the drawings, a snag-free and stress-free fish catcher according to a first preferred embodiment of the present invention is illustrated, wherein the snag-free and stress free fish catcher comprises a supporting frame 10 comprising a boundary rim 11 and a fish pocket 20, which is affixed to the boundary rim 11, having an opening 21 defined within the boundary rim 11 and a fish cavity 22 communicating with the opening 21.

The snag-free and stress-free catcher further comprises a tension resting bed 30, having a tension surface 31, supported within the fish cavity 22, wherein the tension surface 31 of the tension resting bed 30 has a predetermined tension larger than a weight of the fish. Therefore, when the fish is captured within the fish cavity 22 of the fish pocket 20, the fish lies on the tension surface 31 of the tension resting bed 30 in a flatten manner.

According to the preferred embodiment, the supporting frame 10 is made of rigid but lightweight material, such as metal wire, to retain the shape of the opening 21 of the fish pocket 20 so as to substantially support the fish in the fish cavity 22. The supporting frame 10 further comprises a handle frame 12 extended from the boundary rim 11.

The fish pocket 20, which is made of fabric material, comprises a boundary wall 23 defining the fish cavity 22 therewithin, wherein the fish pocket 20 further has a plurality of water meshes 24 provided on the boundary wall 23 for water permeation so as to enhance the maneuverability of the fish catcher when submerged in the water.

The tension resting bed 30 comprises a bed panel 32 defining the tension surface 31 thereon wherein the bed panel 32 has a plurality of water pores 321 provided thereon for water permeation to ensure the maneuverability of the fish catcher without snagging of the fish appendage in the fish catcher.

According to the preferred embodiment, the bed panel 32 is made of foaming material or elastic material to provide a predetermined tension on the tension surface 31 of the tension resting bed 30. Accordingly, due to the tensional force, the tension surface 31 of the tension resting bed 30 is stretched out in a flatten manner such that when the fish is captured in the fish cavity 22 of the fish pocket 20, the fish lies on the tension surface 31 of the tension resting bed 30 in a flatted manner, so as to prevent the fish from being stretched in the fish cavity 22.

Accordingly, the tensional force on the tension surface 31 of the tension resting bed 30 is larger than the weight of the fish such that the tension resting bed 30 is adapted for evenly distributing the downward force of the fish as a cushion effect to minimize the stress of the fish captured within the fish cavity 22 of the fish pocket 20. In addition, since the fish will struggle in the fish pocket 20, the tensional force of the tension resting bed 30 is adapted in respond to the struggling of the fish so as to prevent the fish escaping from the fish pocket 22.

It is worth to mention that the fish is supported on the tension surface 31 of the tension resting bed 30 in a flatten manner, fish scales, fish fins, or other fish appendages will not be ensnared or entangled in the water pores 321 of the bed panel 32, thereby preventing the snagging of the fish appendage in the fish catcher.

Figure 2:
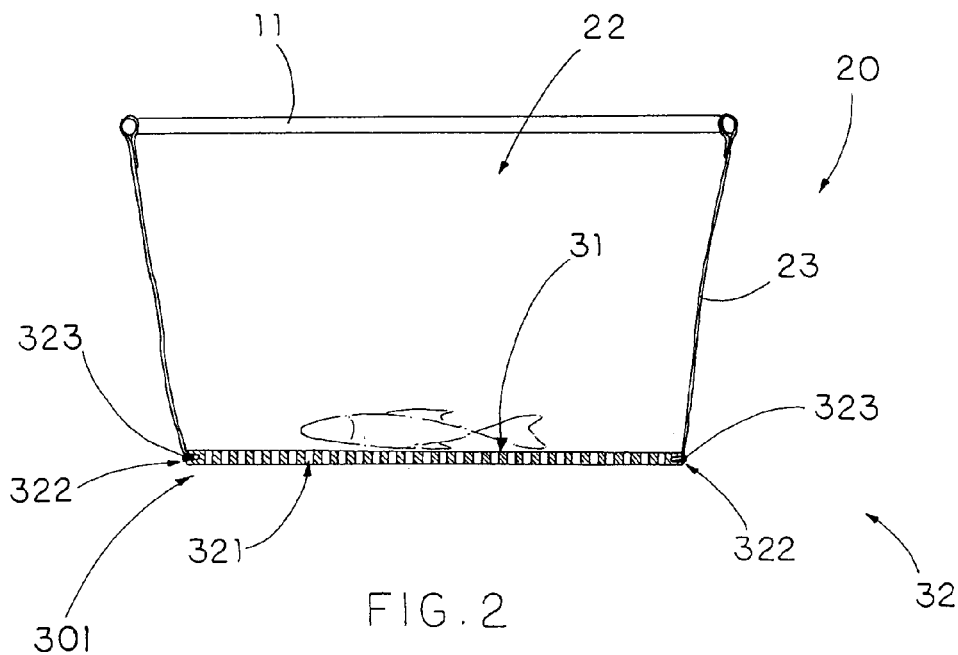
FIG. 2 is a sectional view of the snag-free and stress-free fish catcher according to the above first preferred embodiment of the present invention.

As shown in FIG. 2, the bed panel 32 further has an attaching groove 322 formed on an outer surrounding edge wherein a peripheral edge portion of the boundary wall 23 of the fish pocket 20 is securely received in the attaching groove 322 to form a sealing seam 301 so as to substantially mount the tension resting bed 30 to the fish pocket 20. The bed panel 32 further comprises an edge holder 323 sealedly affixed to the attaching groove 322 to securely hold the peripheral edge portion of the boundary wall 23 within the attaching groove 322 so as to retain the tension resting bed 30 in position.

In order to capture the fish, the user is able to submerge the fish catcher in the water to catch the fish within the fish pocket 22 while the water meshes 24 of the fish pocket 20 and the water pores 321 of the tension resting bed 30 allow the water to pass therethrough to ensure the maneuverability of the fish catcher. Once the fish is captured within the fish pocket 22, the user is able to lift up the fish catcher above the water level such that the fish is supported on the tension surface 31 of the tension resting bed 30 in a flatten manner so as to prevent the fish from snagging within the fish pocket 22. It is worth to mention that when the fish catcher is lifted up above the water level, the water within the fish pocket 22 is released through the water pores 321 of the tension resting bed 30 so as to reduce the weight of the fish catcher while fish catching operation.

Figure 3:
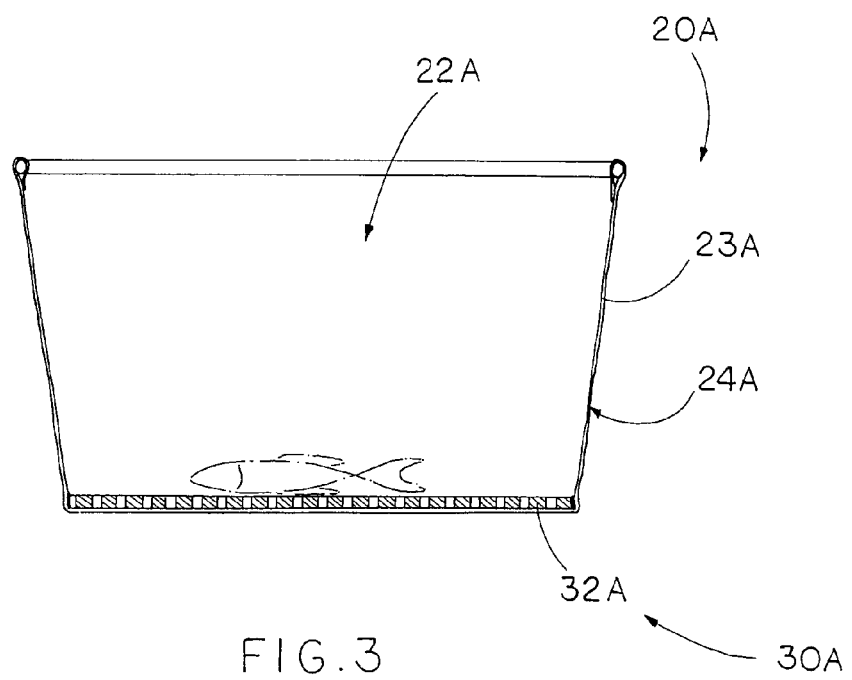
FIG. 3 illustrates an alternative mode of the tension resting bed of the snag-free and stress-free fish catcher according to the above first preferred embodiment of the present invention.

FIG. 3 illustrates a first alternative mode of the fish catcher. The fish pocket 20A comprises a pocket body 23A, having a plurality of water meshes 24A, defining the fish cavity 22A therein, wherein the bed panel 32A of the tension resting bed 30A disposed in the pocket body 23A to form the tension surface 31A within the fish cavity 22A.

A peripheral edge of the bed panel 32A is sealedly affixed to an inner wall of the pocket body 23A to retain the tension resting bed 30A within the fish cavity 22A in position. Therefore, when the fish is captured in the fish cavity 22A, the fish is supported on the tension surface 31A of the tension resting bed 30A in a flatten manner.

Figure 4:
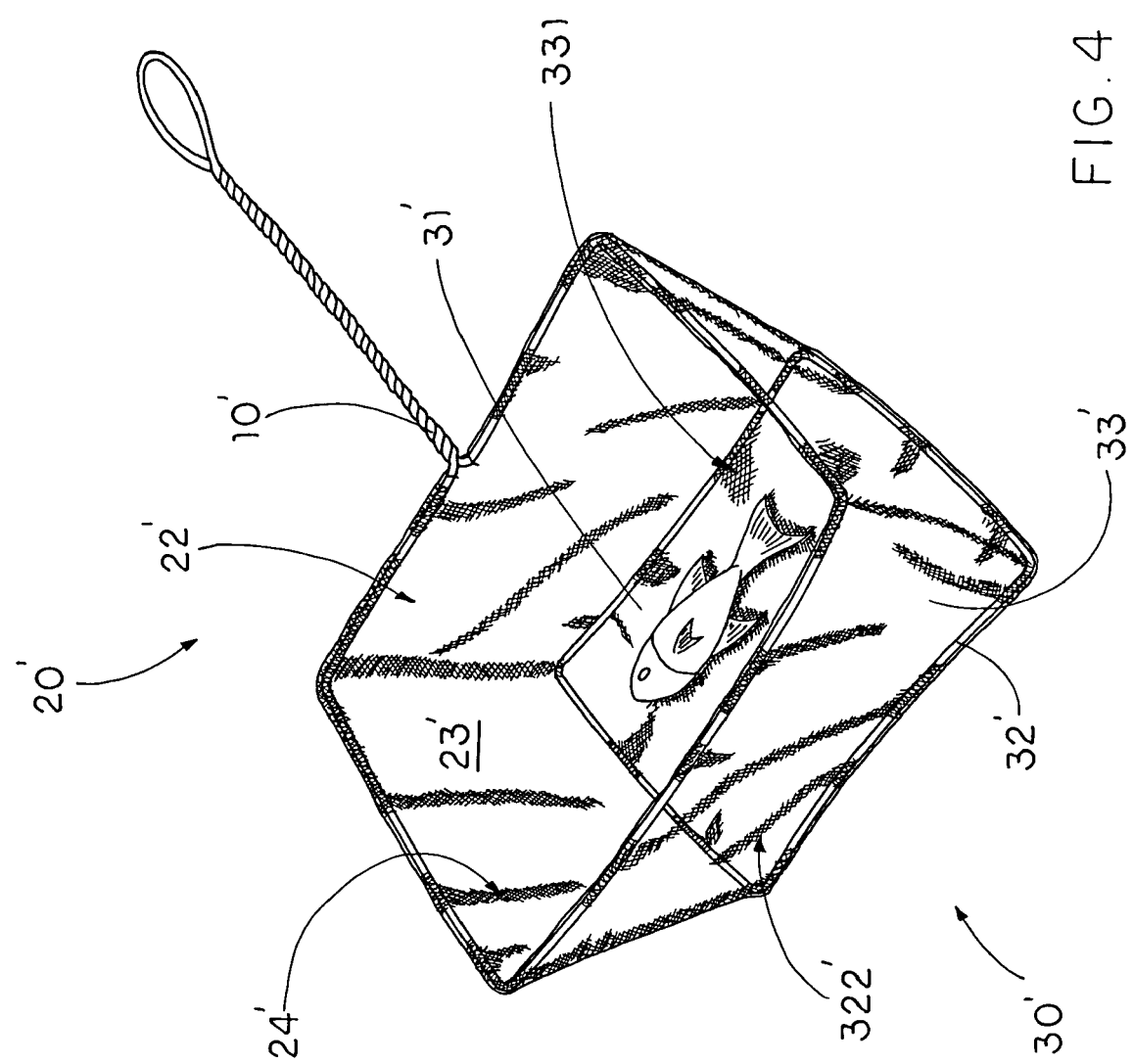
FIG. 4 is a perspective view of a snag-free and stress-free fish catcher according to second preferred embodiment of the present invention.

As shown in FIG. 4, a snag-free and stress-free fish catcher of a second embodiment illustrates an alternative mode of the fist embodiment of the present invention, wherein the tension resting bed 30' is alternatively modified.

The tension resting bed 30', according to a second embodiment, comprises a looping frame 32' defining a central window 322', mounted in the fish cavity 22' of the fish pocket 20' and a tension fabric panel 33' mounted on the looping frame 32' to cover the central window 322' so as to form the tension surface 31' at the central window 322' of the looping frame 32'.

The looping frame 32' is made of rigid material, such as metal wire, to retain the shape of the central window 322' such that when the tension fabric panel 33' is mounted to the looping frame 32' to cover the central window 322', the tension fabric panel 33' retains a predetermined tension on the tension surface 31' of the tension resting bed 30'.

According to the second embodiment, the fish pocket 20', which is supported by the supporting frame 10', comprises a boundary wall 23' defining the fish cavity 22' therewithin, wherein a peripheral edge portion of the boundary wall 23' of the fish pocket 20' is securely affixed to the looping frame 32' to substantially mount the tension resting bed 30' to the fish pocket 20'. Accordingly, the fish pocket 20' further has a plurality of water meshes 24' provided on the boundary wall 23' for water permeation so as to enhance the maneuverability of the fish catcher when submerged in the water. Alternatively, the fish pocket 20' can be made of a pocket body defining the fish cavity therein and having a plurality of water meshes, as shown in FIG. 3, wherein the looping frame 32' is sealedly affixed to an inner wall of the pocket body of the fish pocket 20' to form the tension surface 31' within the central window 322' thereof.

The tension fabric panel 33' is made of lightweight and durable fabric material, such as mesh fabric or nylon, which is capable of evenly supporting the downward force of the fish exerted on the tension surface 31', wherein a peripheral edge portion of the tension fabric panel 33' is securely affixed to the looping frame 32' to cover the central window 322' thereof to form the tension surface 31' within the loop frame 32'.

Accordingly, the tension fabric panel 33' has a plurality of water pores 331' provided thereon for water permeation. Preferably, the tension fabric panel 33' can be made of elastic and durable sheet material mounted on the looping frame 32' to cover the central window 322' thereof so as to physically provide the tension on the tension surface 31' of the tension resting bed 30' through the elasticity of the tension fabric panel 32' so as to enhance the tensional force of the tension surface 31' of the tension resting bed 30'.

Alternatively, the looping frame 32' is made of resilient material such that when the tension fabric panel 33' is mounted on the looping frame 32' to cover the central window 322', the looping frame 32' provides a resilient force for stretching out the tension fabric panel 33' so as to retain a predetermined tension on the tension surface 31' of the tension resting bed 30'.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A snag-free and stress-free fish catcher, comprising:
   a supporting frame comprising a boundary rim which extends in a first plane;
   a fish pocket, which is affixed to said boundary rim, having an opening defined within said boundary rim and a fish cavity communicating with said opening, wherein said fish pocket has both a size adapted for capturing one single fish at each time within said fish cavity and a plurality of water meshes provided thereon for water permeation, said fish pocket comprises a boundary wall defining said fish cavity therewithin; and
   a tension resting bed, having a tension surface, supported within said fish cavity, where said tension surface of said tension resting bed has a predetermined tension larger than a weight of the fish, wherein said tension resting bed is adapted for ensuring the fish lying flat on said tension surface when the fish is captured within said fish cavity of said fish pocket, such that said tension resting bed is adapted not only for evenly distributing the weight of the fish as a cushion effect to minimize stress of the fish captured within said fish cavity but also in response to the struggling of the fish so as to prevent the fish escaping from said fish pocket, said tension resting bed consists of a single rectangular bed panel which both extends in a second plane and defines said tension surface thereon, said first and second planes being parallel to each other, wherein said bed panel is made of elastic material to provide the tension on said tension surface of said tension resting bed, said bed panel has a plurality of water pores provided thereon for water permeation, wherein said bed panel has an attaching groove formed on an outer surrounding edge such that a peripheral edge portion of said boundary wall of said fish pocket is securely received in said attaching groove to form a sealing seam so as to substantially mount said tension resting bed to said fish pocket, and said bed panel further comprises an edge holder sealedly affixed to said attaching groove to securely hold said peripheral edge portion of said boundary wall within said attaching groove so as to retain said tension resting bed in position.

\* \* \* \* \*